2,840,451

SEPARATION OF INORGANIC SALTS FROM ORGANIC SOLUTIONS

Leonard I. Katzin, Plainfield, and James C. Sullivan, Downers Grove, Ill., assignors to the United States of America as represented by the United States Atomic Energy Commission No Drawing. Application September 20, 1951
Serial No. 247,556

10 Claims. (Cl. 23—14.5)

This invention deals with a process for separating inorganic salts from organic solvent solutions and in particular with the separation of inorganic salts from a solution containing said salts in an oxygen-containing organic solvent.

It is an object of this invention to provide a process by which dissolved inorganic salts can be separated from organic solutions in a simple and efficient manner.

It is another object to provide a process for separating uranium values from thorium values from organic solutions.

According to this invention the solutions having the salts dissolved in an oxygen-containing organic compound are contacted with an ion exchange resin whereby sorption of the entire salt on the resin takes place and then separating the salt-depleted liquid and the resin from each other.

It has been found that the solutions as set forth above, when contacted with anion exchange resin, do not react therewith in the conventional manner and ion exchange does not take place, but that instead the dissolved salts are sorbed by the resin in their entirety. The reaction seems to be based on an anion formation of the entire salt by complexing with the anion of the resin.

Various kinds of salts may be separated efficiently by the process of this invention. Cobalt chloride, lithium chloride, nickel chloride, cobalt nitrate, nickel nitrate, uranyl chloride, uranyl nitrate, and plutonium nitrate, for instance, have been recovered from organic solutions by the process of this invention. In general, it may be stated that salts which are soluble in the organic oxygen-containing solvent also possess the characteristic required, namely, the ability of anion formation of the salt with the anion of the resin.

Various kinds of organic compounds which are good solvents for the salts to be separated are usable provided they contain an oxygen atom. Ketones, ethers and alcohols have been found suitable, the alcohols being less favorable, though, due to a solvation effect. The preferred solvents were acetone and methyl isobutyl ketone (hexone). The concentrations of the solutions are not critical and can vary in wide ranges; however, concentrations of from 0.01 to 0.1 M are preferred.

Anion exchange resins, such as amine type resins, and preferably strong base or quaternary ammonium type resins, preferably in their chloride or nitrate form, can be used successfully. The quaternary amine type resins Amberlite IRA–400, Dowex–1, Dowex–2, and the phenol formaldehyde tertiary amine resin Duolite A–2 are suitable.

Dowex–1 and Dowex–2 are strongly basic anion exchange resins; they are quaternary ammonium salts (R R' R'' R''' $N^+A^-$) in which one of the R's is derived from polystyrene which in turn has been cross-linked with divinylbenzene for maximum exchange capacity and to render the resins insoluble in aqueous and nonaqueous media. The resultant products are highly dissociated organic bases in which the large cationic body is limited in movement and the relatively small and mobile anion is free to exchange in a wide pH range. In the case of Dowex–1, three of the R groups in the general quaternary salt structure are methyl groups, whereas in Dowex–2 one of the methyl groups is replaced by hydroxyl ethyl. The chief difference between Dowex–1 and Dowex–2 results from the fact that Dowex–1 is somewhat more basic in nature than Dowex–2. This information on the Dowex resins is shown in Ind. Eng. Chem. 43, 1088 (1951). The process of making Dowex–1, for instance, is disclosed in U. S. Patent No. 2,559,529, in column 2, line 36, through column 3, line 22, and also in column 3, lines 59–63.

It is advantageous to pretreat or condition the resin prior to contacting it with the solution. This may be done by washing it with an aqueous solution of hydrochloric acid, sodium nitrate or sodium chloride, for instance, of a concentration of 1 M; 10 M aqueous hydrochloric acid has also been successfully used for this purpose. The resin was allowed to stand with the conditioning solution for about one hour and then washed with water and air-dried. The air-dried resin contained about 8% of water.

Thereafter, the resin was ready for use in the process of this invention. The solution containing the salt to be recovered was contacted with the resin at room temperature for a period of time ranging from twenty-four to seventy-two hours when an equilibrium had been established. Shorter contacting times, however, will also give satisfactory results. The ratio of salt to resin was from 1 to 3 millimoles salt per gram of resin, the exact amount depending on the anion content of the resin and the composition of the solution. In a great many experiments 2 ml. of solution were contacted with 0.2 g. of resin.

It was found that in some instances the water content present during contacting, which may either be the water content of the resin or that of the organic solution, has a bearing on the degree of sorption; this has been found true particularly in the case of cobalt salts.

This is shown in the table given below; in the experiments compiled there various cobalt salts dissolved in acetone or tertiary butyl alcohol were contacted with Dowex-1 resin, chloride or nitrate form, which had varying water contents.

TABLE

| Organic Solution | Resin | Water Content of Resin, percent | Quantity of Salt Sorbed by Resin |
|---|---|---|---|
| $CoCl_2$ in acetone | Chloride resin | 22 | 1.25 mM/g. resin (millimoles salt per gram resin). |
| Do | | 8.3 | 0.25 mM/g. resin (millimoles salt per gram resin). |
| Do | | 6.8 | 0.35 mM/g. resin (millimoles salt per gram resin). |
| $CoCl_2$ in acetone plus 1% $H_2O$ | | 6.8 | 1.0 mM/g. resin (millimoles salt per gram resin). |
| $CoCl_2$ in tertiary butyl alcohol | Chloride resin | 22 | <0.2 mM/g. resin at residual concn. of 0.03 M.<br><0.4 mM/g. resin at residual concn. of 0.06 M. |
| | | 6.8 | 0.02 mM/g. resin at residual concn. of 0.02 M.<br>0.15 mM/g. resin at residual concn. of 0.1 M. |
| $Co(NO_3)_2$ in acetone | Nitrate resin containing 0.31% Cl-. | 8.4 | 0.88 mM/g. resin at residual concn. of 0.01 M.<br>1.2 mM/g. resin at residual concn. of 0.08 M. |
| | | 4 | About the same as with 8.4% $H_2O$. |
| $CoCl_2$ in acetone | Nitrate resin | 8.4 | 1.5 mM/g. resin at residual concn. of 0.05 M.<br>0.72 mM/g. resin at residual concn. of 0.025 M. |
| | | 4 | |
| $Co(NO_3)_2$ in acetone | Chloride resin | 22 | 0.5 mM/g. resin at residual concn. of 0.05 M.<br>1.0 mM/g. resin at residual concn. of 0.1 M.<br>1.5 mM/g. resin at residual concn. of 0.15 M. |
| | | 6.8 | 0.1 mM/g. resin at residual concn. of 0.015 to 0.03 M. |

These results show that the presence of water has a favorable effect on the sorption of cobalt salts by the resin.

If recovery of the sorbed salt is desired, it may be eluted from the resin with water.

The entire process may be carried out as a batch process or in a continuous manner, for instance in columns.

The process has many applications. For instance, it may be advantageously used for the separation of uranium values from organic solution, and for instance for the separation from thorium values dissolved, e. g., in acetone. In this case, the uranium is taken up by the resin, and the thorium remains in the organic solution. Other possible uses are the separation of plutonium from fission products and that of uranium from fission products where the fission products remain in solution while the plutonium and/or uranium are taken up by the resin.

The following examples are given to show some applications of the process. It is not intended to have the scope of the invention restricted to the details given therein.

*Example I*

Dowex-1 resin was allowed to stand with 1 M $NaNO_3$ for one hour and then washed with water and air-dried. Another portion of the resin was similarly prepared with 1 M HCl. Two 0.8-gram portions of each resin were placed in separate test tubes, and an 8-ml. quantity each of uranyl nitrate-acetone solution and thorium nitrate-acetone solution was added, one each to the nitrate resin and one quantity each to the chloride resin. The tubes were agitated for forty-four and one-half hours and then allowed to stand for two hours for settling. The supernatant was then removed and analyzed. The analyses showed that better than 80% of the uranium had been sorbed on each of the two resins and that sorption of the thorium was practically zero in the two other instances.

*Example II*

This example illustrates the separation of both, uranyl nitrate and plutonium(IV) nitrate, from a hexone solution thereof.

A hexone solution of $Pu(NO_3)_4$ was prepared by equilibrating 4 ml. of a solution 1 M in nitric acid and approximately saturated with ammonium nitrate and also containing microgram amounts of $Pu(NO_3)_4$ with successive portions of ketone to a total of 10 ml.

A stock solution was made by mixing 0.1 volume of this hexone solution with 4 M uranyl nitrate in hexone solution. Two ml. of this solution were equilibrated with 0.2-g. portions of resin for six hours. In one such batch experiment the solution was decolorized, which showed removal of the uranium salt by the resin, and the original α activity of 120,000 counts/min./ml. had been reduced to 3500 counts/min. which showed that almost all plutonium originally present in the stock solution had been removed.

It will be understood that this invention is not to be limited to the details given herein but that it may be modified within the scope of the appended claims.

What is claimed is:

1. The process of recovering nonionized salts selected from the group consisting of uranyl nitrate, plutonium nitrate and a mixture of uranyl nitrate and plutonium nitrate from solutions in an organic oxygen-containing solvent selected from the group consisting of ketones, alcohols and ethers, consisting of contacting said solutions with a strong-base quaternary ammonium type anion exchange resin whereby sorption of the salt on the resin takes place, and separating the resin from a salt-depleted liquid.

2. The process of claim 1 wherein the sorbed nitrate is eluted from the resin with water.

3. The process of claim 1 wherein the solvent is acetone.

4. The process of claim 1 wherein the solvent is hexone.

5. The process of recovering uranyl nitrate from a ketone solution, consisting of contacting said solution with a strong-base quaternary ammonium type anion exchange resin in its nitrate form whereby sorption of the uranyl nitrate on the resin takes place, and separating the resin from the ketone.

6. The process of separating uranium from thorium, which consists of dissolving uranyl and thorium salts in a ketone, contacting the solution obtained with a strong-base quaternary ammonium type anion exchange resin whereby the uranyl salt is taken up by the resin while the thorium salt remains in solution, and separating the resin with the uranium from the thorium-containing solution.

7. The process of claim 6 wherein the resin is in the chloride form.

8. The process of claim 6 wherein the resin is in the nitrate form.

9. The process of claim 6 wherein the ketone is hexone.

10. The process of claim 6 wherein the ketone is acetone.

(References on following page)

References Cited in the file of this patent

UNITED STATES PATENTS

| | | |
|---|---|---|
| 2,546,938 | Bauman et al. | Mar. 27, 1951 |
| 2,728,633 | Arden et al. | Dec. 27, 1955 |

FOREIGN PATENTS

| | | |
|---|---|---|
| 654,696 | Great Britain | June 27, 1951 |

OTHER REFERENCES

Myers: Industrial and Engineering Chemistry, vol. 35, No. 8, pp. 858–863 (1943).

Stromquist et al.: Industrial and Engineering Chemistry, vol. 43, No. 5, pp. 1065–1070 (May 1951).